US012619405B2

(12) United States Patent
Jana et al.

(10) Patent No.: US 12,619,405 B2
(45) Date of Patent: May 5, 2026

(54) METHOD AND SYSTEM FOR INCREMENTAL FUNCTIONAL APPROACH-BASED DATAFLOW ANALYSIS

(71) Applicant: Tata Consultancy Services Limited, Mumbai (IN)

(72) Inventors: Anushri Jana, Pune (IN); Bharti Chimdyalwar, Pune (IN); Ramanathan Venkatesh, Pune (IN); Shrawan Kumar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 193 days.

(21) Appl. No.: 18/243,710

(22) Filed: Sep. 8, 2023

(65) Prior Publication Data

US 2024/0143299 A1     May 2, 2024

(30) Foreign Application Priority Data

Oct. 28, 2022     (IN) ............................. 202221061597

(51) Int. Cl.
  *G06F 8/41*          (2018.01)
  *G06F 8/71*          (2018.01)
(52) U.S. Cl.
  CPC ................ *G06F 8/433* (2013.01); *G06F 8/71* (2013.01)
(58) Field of Classification Search
  CPC ........ G06F 8/433; G06F 8/71; G06F 11/3604; G06F 8/75
  See application file for complete search history.

(56) References Cited

U.S. PATENT DOCUMENTS 7,962,434 B2     6/2011   Estan et al.
9,817,643 B2    11/2017   He et al.
(Continued)

FOREIGN PATENT DOCUMENTS

CN          109426722 A      3/2019
JP            6234935 B2     11/2017

OTHER PUBLICATIONS

Arzt, S., & Bodden, E. (May 2014). Reviser: efficiently updating IDE-/IFDS-based data-flow analyses in response to incremental program changes. In Proceedings of the 36th International Conference on Software Engineering (pp. 288-298). (Year: 2014).*
(Continued)

*Primary Examiner* — Wei Y Mui
*Assistant Examiner* — Vivian Weijia Duan
(74) *Attorney, Agent, or Firm* — Finnegan, Henderson, Farabow, Garrett & Dunner, LLP

(57)          ABSTRACT

This disclosure relates generally to method and system for incremental functional approach-based dataflow analysis. Static dataflow analysis can take hours to days depending on size and complexity of the code. In today's agile development environment faster analysis is required which can handle incremental changes to the code in an efficient manner. The method includes by performing a static dataflow analysis over a set of functions of a source code. Further, obtains a set of impacted functions from the source code and executes a dataflow analysis over the set of impacted functions of the source code. The method performs an incremental functional approach-based dataflow analysis over the set of impacted functions including an incremental bottom-up analysis and an incremental top-down analysis. The method efficiently updates results of dataflow analysis in response to incremental changes which is fast and scal-
(Continued)

300 perform a static dataflow analysis over a set of functions of a source code — 302

Identify a set of edited functions from the set of functions based on at least one change observed in the source code, wherein each function represents a node comprising a set of statements being called in the source code — 304 obtain a set of impacted functions based on at least one change observed between a current version summary of the source code and a previous version summary of the source code — 306 execute a dataflow analysis over the set of impacted functions of the source code by performing an incremental bottom-up analysis on one or more selected functions and an incremental top-down analysis over the set of impacted functions — 308 perform an incremental functional approach based on the dataflow analysis over the set of impacted functions based on the current version summary of the source code, the incremental bottom-up analysis, and the incremental top-down analysis — 310 able and minimizes the number of procedures by comparing summaries across the versions.

12 Claims, 6 Drawing Sheets

(56)                    References Cited

U.S. PATENT DOCUMENTS

| | | | |
|---|---|---|---|
| 10,127,135 B2 | 11/2018 | Li et al. | |
| 11,175,897 B1 * | 11/2021 | Deng | G06F 8/51 |
| 2013/0031531 A1 * | 1/2013 | Keynes | G06F 8/74 |
| | | | 717/126 |
| 2016/0098342 A1 * | 4/2016 | Faizanullah | G06F 11/3447 |
| | | | 717/131 |
| 2017/0017472 A1 * | 1/2017 | He | G06F 8/433 |

OTHER PUBLICATIONS

Pollock et al., "An Incremental Version of Iterative Data Flow Analysis," IEEE Transactions on Software Engineering, 15(12) (1989).
Reps et al., "Interprocedural Dataflow Analysis via Graph Reachability."
Rountev et al., "Interprocedural Dataflow Analysis in the Presence of Large Libraries," (2006).
Schubert et al., "Lossless, Persisted Summarization of Static Callgraph, Points-To and Data-Flow Analysis," (2012).
Shi et al., "Pipelining Bottom-up Data Flow Analysis," (2020).

* cited by examiner

300 perform a static dataflow analysis over a set of functions of a source code

302 identify a set of edited functions from the set of functions based on at least one change observed in the source code, wherein each function represents a node comprising a set of statements being called in the source code

304 obtain a set of impacted functions based on at least one change observed between a current version summary of the source code and a previous version summary of the source code

306 execute a dataflow analysis over the set of impacted functions of the source code by performing an incremental bottom-up analysis on one or more selected functions and an incremental top-down analysis over the set of impacted functions

308 perform an incremental functional approach based on the dataflow analysis over the set of impacted functions based on the current version summary of the source code, the incremental bottom-up analysis, and the incremental top-down analysis

METHOD AND SYSTEM FOR INCREMENTAL FUNCTIONAL APPROACH-BASED DATAFLOW ANALYSIS

PRIORITY CLAIM

This U.S. patent application claims priority under 35 U.S.C. § 119 to: Indian Patent Application No. 202221061597, filed on Oct. 28, 2022. The entire contents of the aforementioned application are incorporated herein by reference.

TECHNICAL FIELD

The disclosure herein generally relates to verifying software program, and, more particularly, to method and system for incremental functional approach-based dataflow analysis.

BACKGROUND

In software systems, software evolves more in continuous integration/continuous deployment (CI/CD) environment. Static analysis refers to techniques for analyzing computer software source code without executing the source code as a computer software program. Static analysis tools are widely used to detect runtime programming errors that includes division by zero, or use of uninitialized variables, in industry strength software. The usefulness is due to their scalability, which comes at the cost of precision. In case of evolving software, when release cycle time is comparable to the static analysis tool running time, the tool's deployment at system testing time is not an option. Therefore, for the static analysis tools to be useful in the CI/CD environment, there is a need for dataflow analysis to be faster for subsequent versions of software. Dataflow analysis is a static analysis technique that is applied over the source code. It models the flow of data throughout a program, for example from one variable to another and across branches and loops.

Static inter-procedural dataflow analysis is commonly used in industry to automatically detect potential bugs in large software systems due to corresponding scalability. However, this scalable analysis can take hours to days depending on size and complexity of the code. In today's agile development environment faster analysis is required which can handle incremental changes to the code in an efficient manner. Whole-program analysis on successive versions is only time consuming. With incremental changes, a developer naturally expects that the tool must report only many false alarms that are impacted by the change in an efficient manner and end up taking a lot of review efforts of the developers.

SUMMARY

Embodiments of the present disclosure present technological improvements as solutions to one or more of the above-mentioned technical problems recognized by the inventors in conventional systems. For example, in one embodiment, a system for incremental functional approach-based dataflow analysis is provided. The system includes performing a static dataflow analysis over a set of functions of a source code. A set of edited functions are identified from the set of functions based on at least one change observed in the source code, wherein each function represents a node comprising a set of statements being called in the source code. Then, a set of impacted functions are obtained based on at least one change observed between a current version summary of the source code and a previous version summary of the source code. Further, a dataflow analysis is executed over the set of impacted functions of the source code by performing an incremental bottom-up analysis on one or more selected functions from the set of functions being traversed in the bottom-up order of a call graph originated from each edited function and performing an incremental top-down analysis over the set of impacted functions by traversing the call graph in the top-down order. The incremental functional approach-based dataflow analysis is performed over the set of impacted functions based on the current version summary of the source code, the incremental bottom-up analysis, and the incremental top-down analysis.

In another aspect, a method for incremental functional approach-based dataflow analysis is provided. The method includes for incremental functional approach-based dataflow analysis is provided. The system includes performing a static dataflow analysis over a set of functions of a source code. A set of edited functions are identified from the set of functions based on at least one change observed in the source code, wherein each function represents a node comprising a set of statements being called in the source code. Then, a set of impacted functions are obtained based on at least one change observed between a current version summary of the source code and a previous version summary of the source code. Further, a dataflow analysis is executed over the set of impacted functions of the source code by performing an incremental bottom-up analysis on one or more selected functions from the set of functions being traversed in the bottom-up order of a call graph originated from each edited function and performing an incremental top-down analysis over the set of impacted functions by traversing the call graph in the top-down order. The incremental functional approach-based dataflow analysis is performed over the set of impacted functions based on the current version summary of the source code, the incremental bottom-up analysis, and the incremental top-down analysis.

In yet another aspect, a non-transitory computer readable medium for incremental functional approach-based dataflow analysis is provided. The system includes performing a static dataflow analysis over a set of functions of a source code. A set of edited functions are identified from the set of functions based on at least one change observed in the source code, wherein each function represents a node comprising a set of statements being called in the source code. Then, a set of impacted functions are obtained based on at least one change observed between a current version summary of the source code and a previous version summary of the source code. Further, a dataflow analysis is executed over the set of impacted functions of the source code by performing an incremental bottom-up analysis on one or more selected functions from the set of functions being traversed in the bottom-up order of a call graph originated from each edited function and performing an incremental top-down analysis over the set of impacted functions by traversing the call graph in the top-down order. The incremental functional approach-based dataflow analysis is performed over the set of impacted functions based on the current version summary of the source code, the incremental bottom-up analysis, and the incremental top-down analysis.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a flowchart of an exemplary method of operation performing incremental functional approach over the source code using the system of FIG. 1, in accordance with some embodiments of the present disclosure.

DETAILED DESCRIPTION

Figure 1:
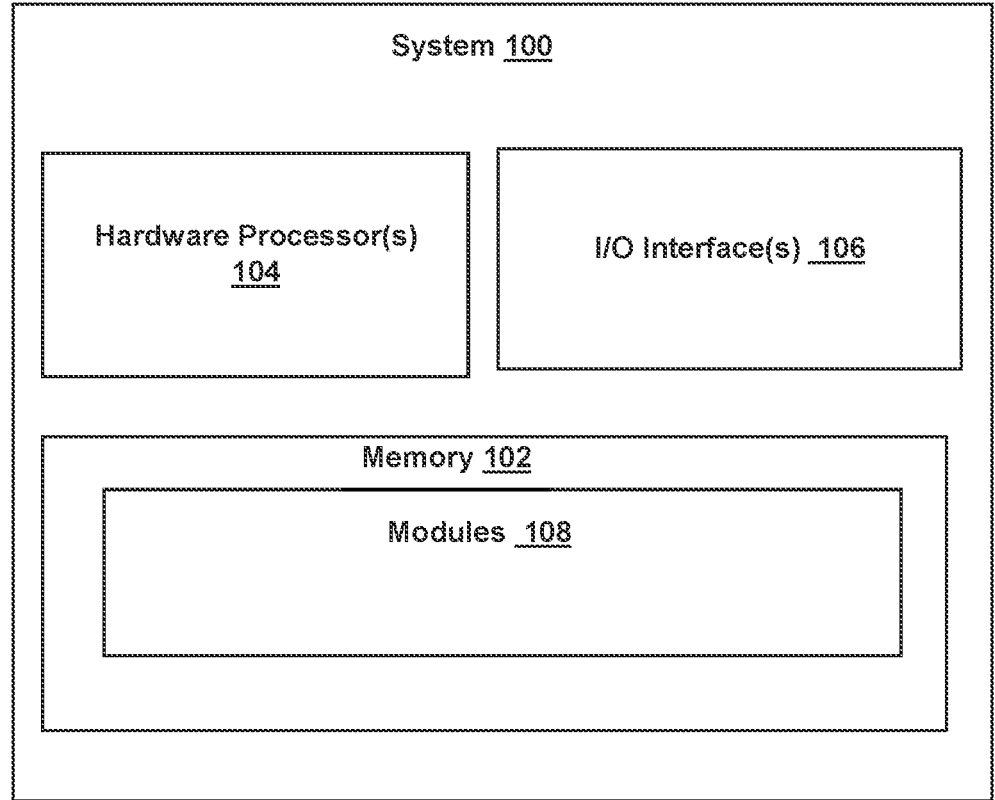
FIG. 1 illustrates an exemplary system for incremental functional approach-based dataflow analysis, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for incremental functional approach-based dataflow analysis. The system enables providing a fast, reliable, and scalable incremental functional approach by comparing summaries between one or more versions of a source code. As software is developed, often, multiple small changes are made. Such changes usually impact only a limited part of the source code. Organizations use static analyses to gain more confidence on at least one change made by creators. Such analyses help creators to review their source code by reasoning about the source code behavior to verify program properties and to detect potential bugs. Dataflow analysis needs information about every statement in the source code comprising a set of statements and in what manner control is passed between them at runtime. Such dataflow analysis selectively recomputes results of one or more incremental changes. To perform such dataflow analysis there is a need for a tool to analyze only changed code and impacted code to speed up static dataflow analysis in subsequent versions of the source code comprising a set of functions. The method of the present disclosure provides technical solution to perform incremental functional approach-based dataflow analysis in two phases. In a first phase, a summary of each procedure is computed for selected procedures of the source code. Further, a call graph of the source code is traversed in a bottom-up order starting from each edited function. Here, edited function refers to one or more changes observed in each procedure of the source code. In a second phase, one or more dataflow values are computed at each impacted function by traversing the call graph in a top-down order. On receiving a modified version of the source code or a set of impacted functions the incremental system computes summary for selected procedures in the first phase and the dataflow values computed in the second phase and updated selectively. The selection of procedures is performed by comparing summaries across each version of the modified source code. The disclosed system is further explained with the method as described in conjunction with FIG. 1 to FIG. 5 below.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary system for incremental functional approach-based dataflow analysis, in accordance with some embodiments of the present disclosure. In an embodiment, the batch processing system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 102 may comprise information pertaining to input(s)/output(s) of each step performed by the processor(s) 104 of the system 100 and methods of the present disclosure. Functions of the components of system 100, for predicting batch processes, are explained in conjunction with FIG. 2 and FIG. 3 providing flow diagram, architectural overviews, and performance analysis of the system 100.

Figure 2:
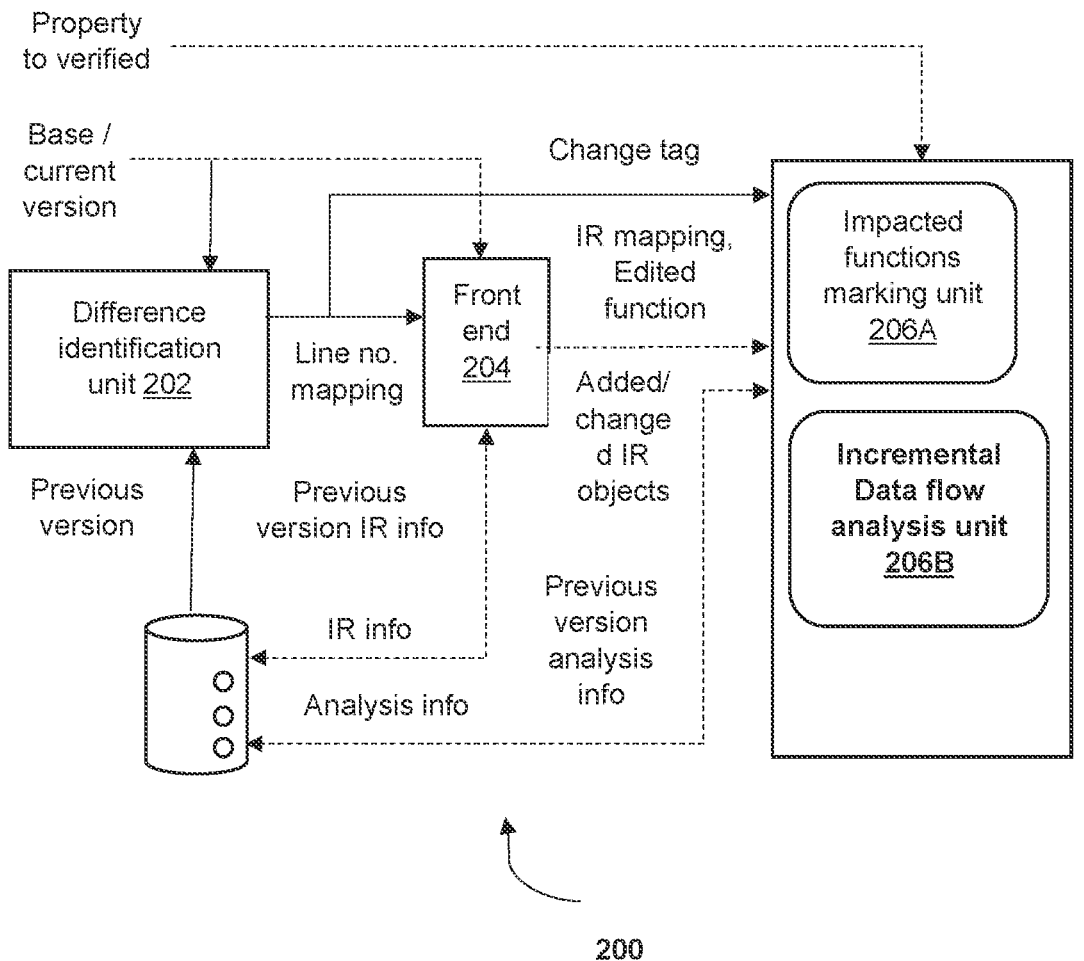
FIG. 2 is a functional block diagram illustration of an exemplary hardware implementation of the system of FIG. 1 for performing incremental functional approach over a source code, in accordance with some embodiments of the present disclosure.

FIG. 2 is a functional block diagram illustration of an exemplary hardware implementation of the system of FIG. 1 for performing incremental functional approach over a source code, in accordance with some embodiments of the present disclosure. The system 200 may be an example of the system 100 (FIG. 1). In an example embodiment, the system 200 may be embodied in, or is in direct communication with the system, for example the system 100 (FIG. 1). In an embodiment, the system 200 may be alternatively referred as an incremental static dataflow analysis tool. The system 200 includes a difference identification unit 202, a front end 204, and a program analysis unit 206. The program analysis unit 206 includes an impacted functions marking unit 206A, and an incremental dataflow analysis unit 206B.

The difference identification unit 202 of the system 100 fetches an input source code or a program code to be analyzed over a set of functions. The source code may be a new program to be referred as a current version of the source code or a previous version of the source code being analyzed. An initial version of the source code can be referred as a base version or a new version of a previously analyzed source code. In an embodiment, when the input which is the base version of the source code into the system, a whole program analysis (WPA) may be performed, and output of the tool is a set of defects from the whole program. When the input source code is the new version of an already analyzed source code, the incremental functional approach-based dataflow analysis is performed, and the output given is the set of defects.

Predominantly the difference identification unit 202 preprocesses the previous version of the source code and the current version of the source code using a GNU DiffUtils tool (known in the art tool) to find textual differences between the two versions of the source code. The type of change in the modified lines of the current source code is determined by comparing with similar lines mapped with the previous version of the source code using python libraries. Incremental analysis is performed when the input source code is the current version, and the output is potentially an impacted part of the source code. All the modules and flow lines are executed while performing the incremental analysis.

The front end 204 converts the high-level language source code into its intermediate representation (IR).

The impacted functions marking unit 206A of the program analysis unit 206 obtains a set of impacted functions based on at least one change observed between a current version summary of the source code and a previous version summary of the source code.

The incremental dataflow analysis unit 206B of the program analysis unit 206 obtains input from the preprocessing stage and generates a dataflow analysis (DFA). This incremental dataflow analysis unit 206B minimizes the number of procedures that are reanalyzed by comparing summaries across the versions of the source code.

Figure 3:
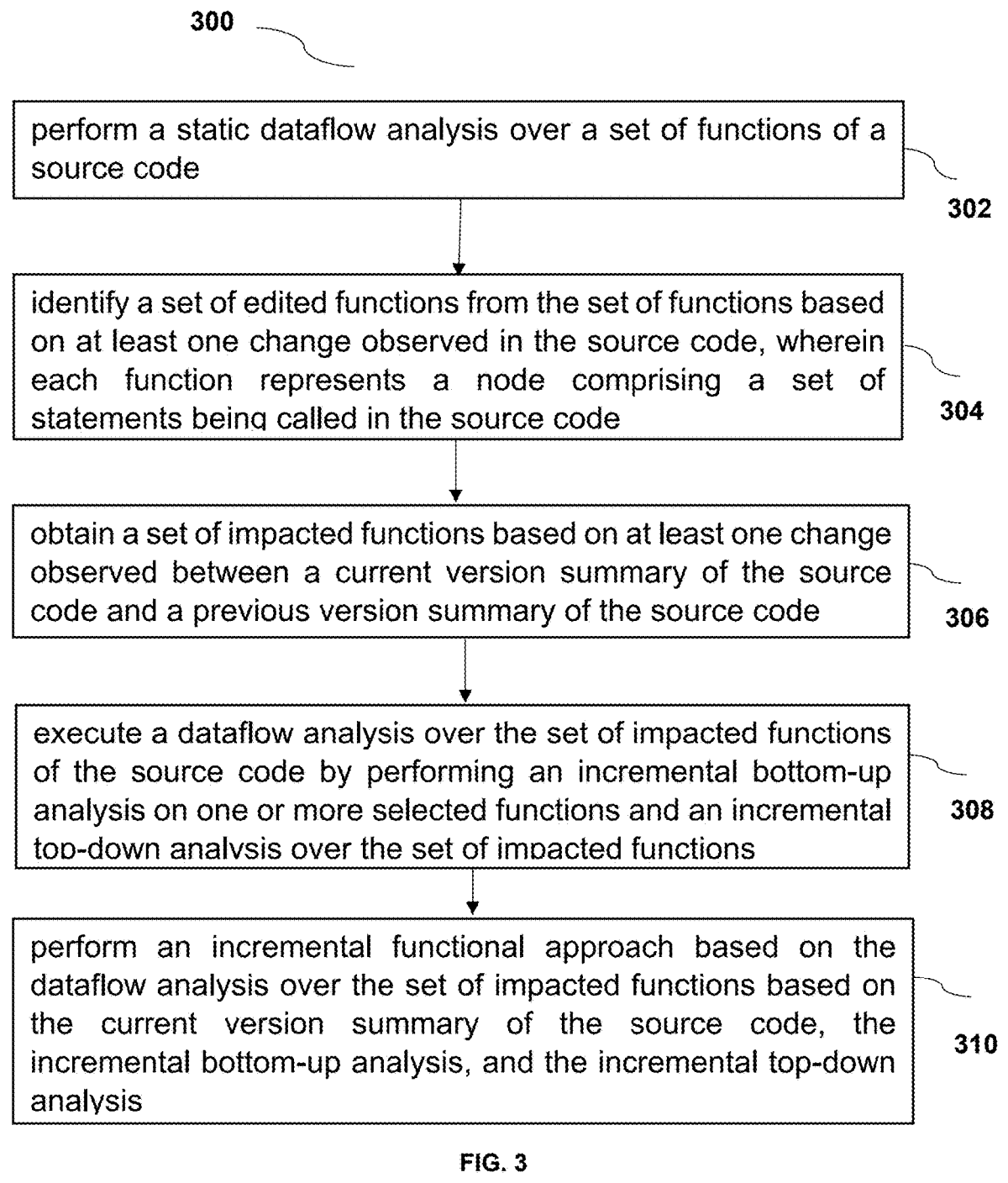

FIG. 3 is a flowchart of an exemplary method of operation performing incremental functional approach over a source code using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 2 through FIG. 5, and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 perform a static dataflow analysis over a set of functions of a source code. Static code dataflow analysis is usually performed as part of the source code review. Dataflow analysis is used to collect runtime information about data or variables associated with the source code. The present disclosure is further explained considering an example (referring now to FIG. 4A), where the system 100 processes the received source code as input and performs static dataflow analysis over a set of functions of the source code. Each function of the source code may include a set of called functions and a set of caller functions. For example, the set of functions (referring to FIG. 4A) from the source code comprises $f1$, $f2$, $f3$, $f4$, $f5$, $f6$, $f7$, and $f8$ and the source code may be considered as a base code or an initial version. The source code is being processed with the incremental functional approach-based dataflow analysis which recomputes a set of impacted functions by leveraging one or more cached previous analysis results, instead of re-running an exhaustive analysis for every changed source code. Here, the example source code is represented as a call graph. Analysis information computed at a node n is denoted by I in the call graph. Each function comprises a set of statements and each function calls at least one function from the set of functions. Here, the set of functions of the source code may be processed with the incremental functional approach comprising an incremental bottom-up analysis and an incremental top-down analysis. The incremental functional approach forms inline summary of each procedure using a bottom-up traversal over the call graph. It analyzes every procedure only once even if the procedure has multiple calls. The resulting summaries computed using the bottom-up traversal are used to replace the calls in the set of caller functions to construct a summary of the set of caller functions and thus, the call graph is traversed bottom-up order. The terms used while performing the incremental functional approach over the source code, F—a set of universal procedures
  n—node
  I—analysis performed at each node
  $I_{summ}$—analysis information computed at the exit of each procedure
  $I_{entry}$—analysis information computed at the entry of each procedure
  $I_{call}$—call statement
Bottom-up traversal ensures that for every call in the set of caller functions, the summary of called procedure is already available.

Figure 4A:
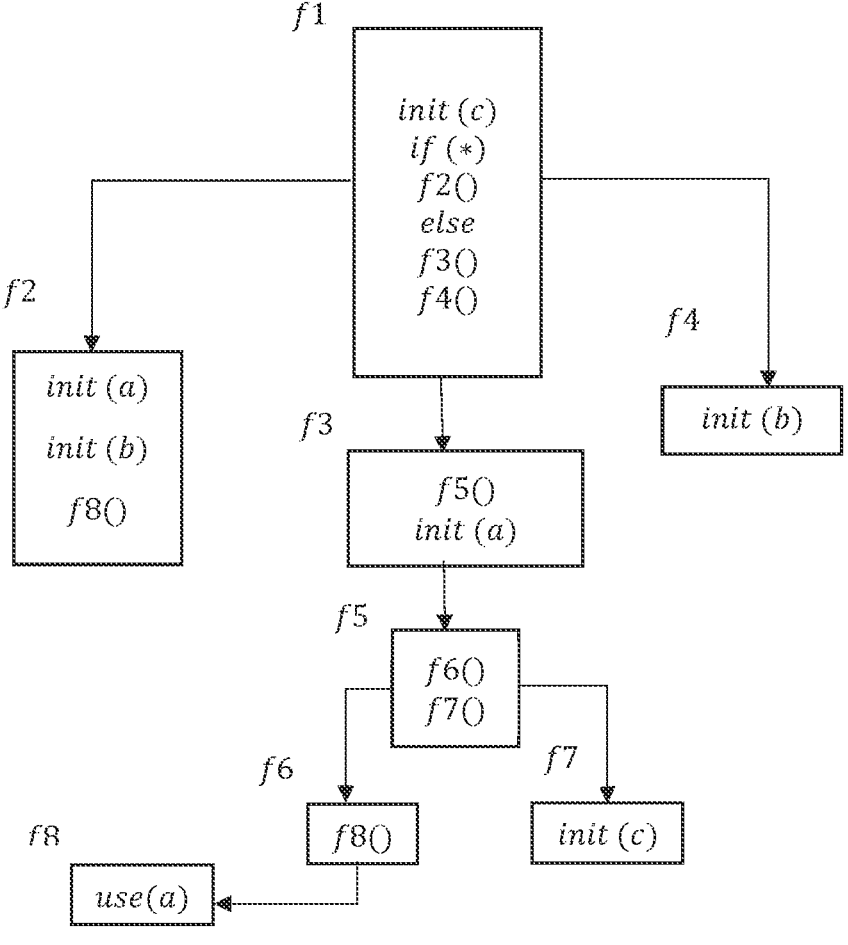
FIG. 4A is a call graph fragmented diagram illustrating previous version of the source code using the system of FIG. 1, according to an embodiment of the present disclosure.

In one embodiment, the call graph as shown in FIG. 4A illustrates uninitialized variable analysis using the incremental functional approach. Each function of the source code represents a procedure with its body. Methods init(var) and use(var) as represented respectively and the variable var is initialized. The example source code has a universal set of variables V as {a, b, c}. For uninitialized variable analysis, $I_{summ}$ is a set of variables defined along all the paths $(I_{summ} \subseteq V)$. Further, the $I_{summ}$ is computed for the procedure of $f8$ since it is one of the leaf nodes of the call graph. $I_{summ}$ for the procedure of $f8$ is /0 (empty set) because it does not contain any assignment statement. Next, $I_{summ}$ for the procedure of $f7$ is computed as $\{c\}$ because of the assignment statement for variable c. Further, the $I_{summ}$ for the procedure of function $f5$ is computed as $\{c\}$ by replacing the calls to procedures of $f6$ and $f7$ with their already computed summaries as /0 and $\{c\}$ respectively.

Referring now to the steps of the method 300, at step 304, the one or more hardware processors 104 identify a set of edited functions from the set of functions based on at least one change observed in the source code. Each function represents a node having the set of statements being called in the source code. For the above example source code as depicted in FIG. 4A, the set of edited functions are identified from the set of functions. Here, the set of procedures to be analyzed are picked up selectively based on at least one change observed in the current version of the source code. The change observed in the source code or at least one change observed in the procedure is referred as edited function and denoted as $F_{edit}$.

Figure 4B:
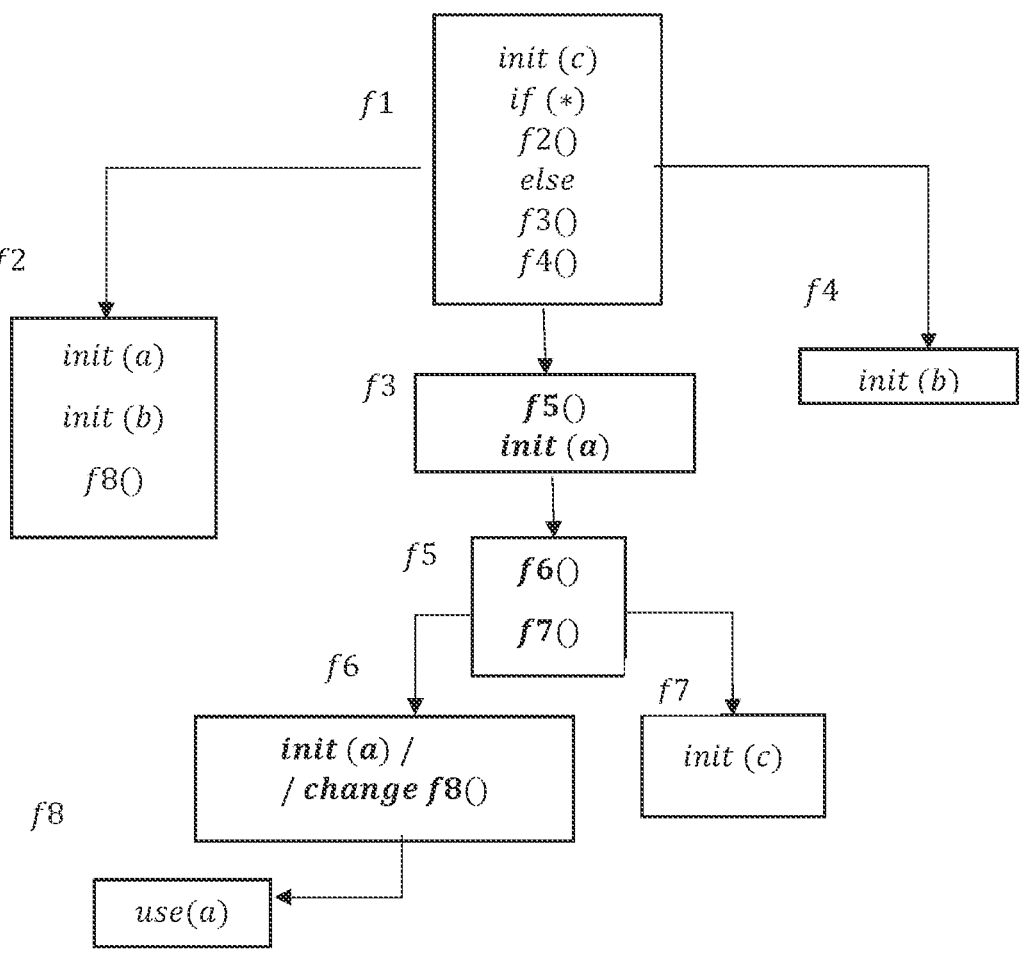
FIG. 4B is a call graph fragmented diagram illustrating current version of the source code using the system of FIG. 1, according to an embodiment of the present disclosure.

Referring now to the steps of the method 300, at step 306, the one or more hardware processors 104 obtain a set of impacted functions based on at least one change observed between a current version summary of the source code and a previous version summary of the source code. FIG. 4B represents example current version of the source code in line where an assignment statement for the variable a—init (a)—is added in procedure $f6$. The first phase in the incremental functional approach-based dataflow analysis, the summary of $F_{edit}$ where function $f6$ is recomputed. Further, $$I_{summ}^{curr}$$

of function $f6$ is computed as $\{a\}$ and is not same as the $$I_{summ}^{prev} \ (\{\}).$$

A caller chain of procedure $f6$ i.e., the procedures $f5$, $f3$, and $f1$ are identified $$I_{summ}^{curr}$$

of $f5$ is computed as $\{a, c\}$ that is not same as $$I_{prev}^{curr} \cdot I_{summ}^{curr}$$

of $f3$ is computed as $\{a, c\}$ that is same as $$I_{prev}^{curr}$$

Hence, further re-computation of summary is stopped. One or more procedures with changed summaries i.e., $f6$ and $f5$ and their direct and transitive callers $f7$ and $f8$ are added to $F_{imp}$. In the second phase, $I_{entry}$ of functions in the $F_{imp}$ is computed in the order $\{f5, f6, f7, f8\}$.

$$I_{entry}^{curr}$$

of the procedure $f8$ is computed as $\{a, c\}$. After the change, variable 'a' is defined along all the call sites of the procedure $f8$. Furthermore, usage of the variable 'a' in procedure $f8$ is found to be initialized in the current version.

Referring now to the steps of the method 300, at step 308, the one or more hardware processors 104 execute a dataflow analysis over the set of impacted functions of the source code by performing an incremental bottom-up analysis on one or more selected functions from the set of functions being traversed in the bottom-up order of a call graph originated from each edited function and performing an incremental top-down analysis over the set of impacted functions by traversing the call graph in the top-down order. The procedures with changed summaries are added to a set referred as the set of impacted functions and denoted as $F_{imp}$. Since the $I_{summ}$ has changed, the $I_{call}$ too may have changed and hence the $I_{entry}$ for the called procedures too may have changed. Further, all the direct and transitively called procedures are marked as potentially impacted functions and add them to $F_{imp}$.

Table 1 depicts incremental dataflow analysis being performing in two phases, in the first phase instead of starting from leaf functions the analysis starts from the $F_{edit}$ over the incremental bottom-up analysis and in the second phase the incremental top-down analysis.

TABLE 1

| Incremental dataflow analysis |
| --- |
| input: $F_{edit}$ - Edited Function<br>procedure incrementalAnalysis<br>  increBottomUp( ) // performing an incremental bottom-up<br>  analysis<br>  increTopDown( ) // performing an incremental top-down<br>  analysis<br>procedure increBottomUp<br>  WLBU = WLBU $\cup$ Fedit<br>  while WLBU $\neq$ Ø do<br>    func = pop (WLBU)<br><br>    $I_{summ}^{prev}$ = getPrevSumm(func) //obtaining the<br><br>  previous version summary of the edited function to compute<br>  the current version summary of the edited function<br><br>    $I_{summ}^{curr}$ = computeSumm(func) //performing when<br><br>  the current version summary of the edited function is not<br>  identical to the previous version summary of the edited function<br>    Fimp = Fimp $\cup$ func<br><br>    if $I_{summ}^{curr} \neq I_{summ}^{prev}$ then<br><br>      updateSumm(func, $I_{summ}^{curr}$) //updating the<br><br>      summary of each edited function with the current<br>      version summary<br>      Fcalled = getCalledFuncsClosure(func)<br>      //identifying a set of called functions from the set<br>      of edited functions<br>      Fimp = Fimp $\cup$ Fcalled<br>        Fcaller = getCallerFunc(func)<br>Procedure increTopDown<br>  //performing the incremental top-down analysis over the set of<br>  impacted functions<br>    WLTD = topDownOrder(F) //loading a top-down worklist |

TABLE 1-continued

Incremental dataflow analysis

```
with a set of procedures
    while WLTD ≠ Ø do
        func = pop(WLTD)
        if func ∈ Fimp then
            Fcalled = getDirectCalledFuncs(func)
//fetching the set of called functions from the set of impacted
functions
            for calledFunc ∈ Fcalled do
```

$$I^{curr}_{entry} = computeEntry(calledFunc)$$

// computing an entry of each called function based on the summary
of the set of impacted functions $updateEntry(calledfunc, I^{curr}_{entry})$ //updating the entry of each called function Incremental functional approach takes $F_{edit}$ as input and uses call graph to find direct and transitive called functions (denoted as $F_{called} \subseteq F$) and the set of caller functions (denoted as $F_{caller} \subseteq F$). The approach performs analysis on the input source code from the previous version summary $$I^{prev}_{summ},$$

entry $$I^{currprev}_{entry}$$

and call top respectively. Incremental functional approach selectively computes fresh summaries for procedures in the current version by calling method increBottomUp( ). The freshly computed and the previous summaries are used by method increTopDown( ) to compute fresh entry information for selected procedures in the current version. These methods update the latest computed summary and entry, that are later used by the client analysis.

In the first phase, the incremental bottom-up analysis computes the set of edited functions summaries and the set of functions summaries marked as the set of impacted functions (Referring to FIG. 4A and FIG. 4B). Further, a set of summaries are computed based on at least one change observed when the current version of the summary and the previous version summary are compared. The incremental bottom-up analysis performs on one or more selected functions from the set of functions being traversed in the bottom-up order of a call graph originated from each edited function by loading a bottom-up worklist of the set of edited functions universally available in a worklist. Further the set of functions are listed to be traversed in the bottom-up order from the bottom-up worklist. The current version summary of the edited function is obtained from the previous version summary of the edited function.

Further, when the current version summary of the edited function is not identical to the previous version summary of the edited function, a sequence of a set of caller functions are identified from the set of edited functions and the current version summary of the set of caller functions is recomputed by the method of the present disclosure. The summary of each edited function is updated with the current version summary and a set of called functions are identified from the set of edited functions and adding the set of called functions universally available in the set of called functions and in the set of impacted functions.

Referring now FIG. 4A and FIG. 4B, the current summary $$I^{curr}_{summ}$$

is computed when compared with the previous version's summary, as $$I^{prev}_{summ}.$$

If summary of $F_{edit}$ remains same, then the analysis stops since result of the previous analysis can be used. However, when the $$I^{curr}_{summ}$$

and the $$I^{prev}_{summ}$$

do not match to recompute the set of summaries of other procedures that too may have been impacted by the change. It is initially started by identifying the chain of callers of $F_{edit}$ and recomputing and comparing their set of summaries. It stops re-computation of summary when a procedure with the same summary as the previous is found. This marks the end of first phase. After computing the set of summaries in the first phase, the dataflow values are computed in the second phase.

In the second phase, the incremental top-down analysis updates one or more dataflow values of the set of impacted functions by traversing the call graph in the top-down order. The incremental top-down analysis updates one or more dataflow values of the set of impacted functions by traversing the call graph in the top-down order. The set of functions to be traversed in the bottom-up order are listed from the bottom-up worklist. Then, the current version summary of the edited function is computed from the previous version summary of the edited function.

The method performs the incremental top-down analysis over the set of impacted functions by traversing the call graph in the top-down order by loading a top-down worklist with a set of procedures and listing the set of impacted functions to be traversed in the top-down order from the worklist. Further, the set of impacted functions are obtained universally available in the set of functions and in the set of impacted functions. The set of called functions are fetched from the set of impacted functions and an entry of each called function is computed based on the summary of the set of impacted functions and updating the entry of each called function. This marks the end of phase 2.

Referring now to the steps of the method 300, at step 310, the one or more hardware processors 104 perform an incremental functional approach-based dataflow analysis over the set of impacted functions based on the current version summary of the source code, the incremental bottom-up analysis, and the incremental top-down analysis. Table 2 depicts the previous version summary and the current version summary of the set of functions of the example source code.

TABLE 2

Incremental dataflow analysis - previous version summary and the current version summary

| Function | $I_{summ}$ | | $I_{entry}$ | |
| | Previous | Current | Previous | Current |
|---|---|---|---|---|
| f1 | {a, b, c} | | { } | |
| f2 | {a, b} | | {c} | |
| f3 | {a, c} | {a, c} | {c} | |
| f4 | {b} | | {a, c} | |
| f5 | {c} | {a, c} | {c} | {c} |
| f6 | { } | {a} | {c} | {a, c} |
| f7 | {c} | | {c} | {a, c} |
| f8 | { } | | {c} | {a, c} |

Referring to the above Table 2 which is the analysis results of FIG. 4A and FIG. 4B where the set of procedures are traversed in top-down order of the call graph. For every procedure other than entry procedure (main( )), the dataflow values reaching the entry node of a procedure are computed from every call to that procedure. The meet of $I_{call}$ from every call defines the $I_{entry}$ of that procedure. To compute the dataflow value at the node n in that procedure, I computed at the node n in phase 1 and the $I_{entry}$ are used. Referring now FIG. 4A and FIG. 4B, the example source code in procedure of function f8 at use(a), the dataflow value is c—procedure of function f8 is called from procedures f2 and f6 and $I_{call}$ is {a, b, c} and {c} respectively. The $I_{entry}$ at procedure of function f8 is computed as {c}. The dataflow value does not contain the variable a implies that an uninitialized variable is used at this node. The column previous in the Table 1 shows $I_{entry}$ for each procedure. The $I_{entry}$ is recomputed only for those procedures that are in $F_{imp}$. Further, the latest dataflow values are available at each function by combining the freshly computed information and the previous information as required.

In one embodiment, the method has been implemented using the incremental static analysis tool. When executed in the incremental mode, the version given for first run was assumed to be the base version. For the base version, the tool run exhaustive analysis and additionally stored the program analysis information. When the next version was run, the tool identified the set of edited functions. Next, IR entities from the previous and current versions were mapped and the incremental algorithm was invoked. The client analysis was invoked that used the dataflow values to identify the potential defects. The method has been evaluated on the core banking system (CBS) of a banking product with millions of lines of code written in COBOL. The CBS has many modules such as customer information, loans, deposits, general ledger, and so on. The method has been evaluated by choosing 16 versions of the frequently changed modules for experiments, with the lines of code ranging from 9KLoC to 87KLoC. Table 3 shows lines of source code, the number of functions, and the number of versions of each module taken for the proposed experimental suite. The base version is the one with the earliest timestamp, and every subsequent version has a change with respect to its previous version.

TABLE 3

Details of core banking system

| Module | KLoC | Functions | Versions |
|---|---|---|---|
| M1 | 27 | 223 | 5 |
| M2 | 31 | 266 | 9 |
| M3 | 29 | 261 | 12 |
| M4 | 19 | 177 | 10 |
| M5 | 25 | 223 | 8 |
| M6 | 30 | 208 | 7 |
| M7 | 39 | 238 | 8 |
| M8 | 87 | 881 | 5 |
| M9 | 70 | 620 | 6 |
| M10 | 36 | 398 | 9 |
| M11 | 24 | 278 | 7 |
| M12 | 41 | 443 | 7 |
| M13 | 20 | 106 | 8 |
| M14 | 11 | 81 | 8 |
| M15 | 9 | 73 | 8 |
| M16 | 12 | 85 | 7 |

A change can be either addition or deletion or modification of (i) condition expression, (ii) assignment statement, or (iii) call/return statement. The incremental static analysis tool identifies the type of changes automatically. For the change type (iii) the tool triggers an exhaustive analysis rather than incremental analysis since it alters the call graph. The experimental suite consisted of changes of type (i) and (ii) and the client analysis being performed is detection of use of uninitialized variables. Exhaustive analysis (EA) and incremental analysis (IA) to each version of 16 modules for example 124 versions. Experiments are conducted on a Windows 10 machine with an Intel Xeon processor running at 2.5 GHz and 128 GB of RAM.

Figure 5:
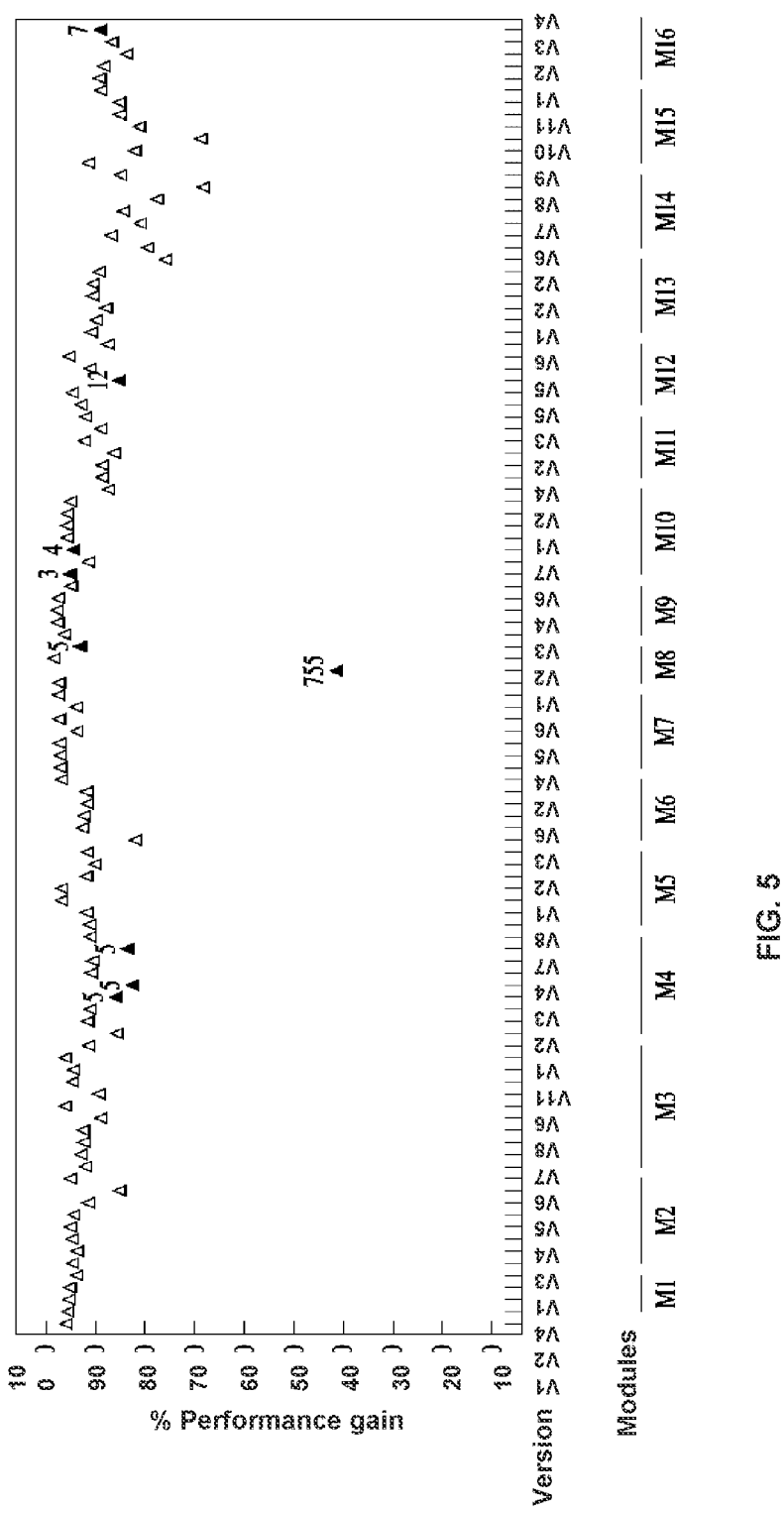
FIG. 5 is a performance gain obtained while performing incremental functional approach-based dataflow analysis over the source code using the system of FIG. 1 according to some embodiments of the present disclosure.

FIG. 5 is a performance gain evaluation obtained while performing incremental functional approach-based dataflow analysis over the source code using the system of FIG. 1 in accordance with some embodiments of the present disclosure, Performance of the method was evaluated when time required to run incremental analysis approach and was compared with the time taken for EA of the changed version. On an average, IA took 0.70 seconds whereas EA took 7.80 seconds. In most cases, the time taken by IA was up to 2 seconds while EA went up to 50 seconds. In some cases, the time taken by IA was less than a second. For instance, versions v1, v2, and v4 of the module M8 took approximately 50 seconds for EA whereas the IA took only 1-2 seconds. However, there were few outliers such as version v3 of the same module M8 where the IA took approximately 28 seconds. The method was further investigated and found that in this version a condition expression was modified such that it added a huge number of new static paths in control flow graph to be analyzed causing analysis to take more time. For example, the condition was modified with the following AND clause having multiple nested OR clauses AND(BATCH–NO='A' OR 'B' OR 'C' OR 'D' OR E). Further, similar observations were identified in versions 3 and v4 of module M15 and version v2 of module M14. Another reason for the IA to take more time is due to addition of an assignment statement. This was the case in versions v1, v6 and v7 of module M14. It was also observed that the time taken by EA and IA for base version v0 of all the modules was almost same. Note that IA for base version means FA and, in addition the time needed to store the analysis information. This indicates that there is no or negligible overhead. It is also calculated the 80% gain in performance for IA versus EA for 108 versions with changes and is shown in FIG. 5. On an average, IA was 90% faster than EA, with maximum performance gain as 98% and minimum gain as 41%. Recall that the method of the present disclosure ensures only few procedures to be reanalyzed, making the IA fast. For 99 out of 108 versions only one procedure for example the set of edited functions was re-analyzed. In these versions, either condition expression or assignment statement was modified, none of which changes the summary of the edited function. Only for 9 out of 108 versions more than one procedure was re-analyzed. The labels besides the solid black triangles indicating the set of procedures that are re-analyzed. The method was investigated and it was found that in these 9 versions, assignment statement has been added resulting in change of the summary of the set of edited functions and other functions in hierarchy too. Moreover, for 8 out of these 9 versions, IA outperformed EA by more than 80%. In the worst case, version v3 of module M8 where 755 out of 881 functions (78992/87000 loc) were re-analyzed, IA has been 41% faster than EA. Note that for modules M14 and M15, the performance gain was smaller than others because the EA as such is much faster (1-2 seconds), It shows summary statistics for the percentage of performance gain including the mean, median, 90th, 95th, 99th, and 50th percentile. All statistics show approximately 90%4 gain in efficiency, indicating the practical effectiveness of the proposed incremental functional approach-based DFA.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of verifying software program. The embodiment thus provides method and system for incremental functional approach-based dataflow analysis. Moreover, the embodiments herein further provide benefit comparing summaries to selectively identify procedures for re-analysis plays the key role in improving efficiency of the incremental functional approach. The method performs fast dataflow analysis using the present method and enables deployment of static analysis tool at the development time.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g. hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of performing incremental functional approach-based dataflow analysis in a source code, the method comprising:

performing via one or more hardware processors a static dataflow analysis over a set of functions of a source code;

identifying via the one or more hardware processors a set of edited functions from the set of functions based on at least one change observed in the source code, wherein each function represents a node comprising a set of statements being called in the source code;

obtaining via the one or more hardware processors a set of impacted functions based on at least one change observed between a current version summary of the source code and a previous version summary of the source code;

executing via the one or more hardware processors a dataflow analysis over the set of impacted functions of the source code which recomputes the set of impacted functions by leveraging one or more cached previous analysis results, instead of re-running an analysis for every changed source code by performing an incremental bottom-up analysis on one or more selected functions from the set of functions being traversed in a bottom-up order of a call graph originated from each edited function, wherein performing the incremental bottom-up analysis further comprises:

loading a bottom-up worklist of a set of edited functions universally available in a worklist;

listing the set of functions to be traversed in the bottom-up order from the bottom-up worklist;

obtaining a previous version summary of the edited function to compute a current version summary of the edited function; and performing when the current version summary of the edited function is not identical to the previous version summary of the edited function, identifying a sequence of a set of caller functions from the set of edited functions and recomputing the current version summary of the set of caller functions, wherein recomputing the current version summary is initially started by identifying a chain of callers of the edited function, recomputing and comparing a respective set of summaries recomputed from the callers of the edited function, and stopping re-computation of the current version summary when a procedure with the current version summary matching the previous version summary is found;

updating a summary of each edited function with the current version summary; and identifying a set of called functions from the set of edited functions and adding a set of called functions universally available to the set of impacted functions;

performing an incremental top-down analysis over the set of impacted functions by traversing the call graph in a top-down order; and performing via the one or more hardware processors, an incremental functional approach-based dataflow analysis over the set of impacted functions based on the current version summary of the source code, the incremental bottom-up analysis, and the incremental top-down analysis, wherein the incremental functional approach-based dataflow analysis forms a summary of each procedure using a bottom-up traversal over the call graph, analyzes every procedure only once even if the procedure includes multiple calls and resulting summaries computed using the bottom-up traversal replace calls in a set of caller functions to construct a summary of the set of caller functions and the call graph is traversed in bottom-up order, implementing via the one or more hardware processors, the incremental functional approach-based dataflow analysis as an incremental static analysis tool that upon execution provides analysis and additionally stores program analysis information.

2. The processor implemented method as claimed in claim 1, wherein the incremental bottom-up analysis computes a set of edited function summaries and a set of function summaries marked as the set of impacted functions, wherein the summaries are computed based on at least one change observed when the current version summary and the previous version summary are compared.

3. The processor implemented method as claimed in claim 1, wherein the incremental top-down analysis updates one or more dataflow values of the set of impacted functions by traversing the call graph in the top-down order.

4. The processor implemented method as claimed in claim 1, wherein performing the incremental top-down analysis comprises:

loading a top-down worklist with a set of procedures and listing the set of impacted functions to be traversed in the top-down order from the worklist;

obtaining the set of impacted functions universally available in the set of functions and in the set of impacted functions;

fetching the set of called functions from the set of impacted functions; and computing an entry of each called function based on a summary of the set of impacted functions and updating the entry of each called function.

5. A system for performing incremental functional approach-based dataflow analysis in a source code comprising:

a memory storing instructions;

one or more communication interfaces; and one or more hardware processors coupled to the memory via the one or more communication interfaces, wherein the one or more hardware processors are configured by the instructions to:

perform a static dataflow analysis over a set of functions of a source code;

identify a set of edited functions from the set of functions based on at least one change observed in the source code, wherein each function represents a node comprising a set of statements being called in the source code;

obtain a set of impacted functions based on at least one change observed between a current version summary of the source code and a previous version summary of the source code;

execute a dataflow analysis over the set of impacted functions of the source code which recomputes the set of impacted functions by leveraging one or more cached previous analysis results, instead of re-running an analysis for every changed source code by performing an incremental bottom-up analysis on one or more selected functions from the set of functions being traversed in a bottom-up order of a call graph originated from each edited function, wherein performing the incremental bottom-up analysis further comprises:

loading a bottom-up worklist of a set of edited functions universally available in a worklist;

listing the set of functions to be traversed in the bottom-up order from the bottom-up worklist;

obtaining a previous version summary of the edited function to compute a current version summary of the edited function; and performing when the current version summary of the edited function is not identical to the previous version summary of the edited function, identifying a sequence of a set of caller functions from the set of edited functions and recomputing the current version summary of the set of caller functions, wherein recomputing the current version summary is initially started by identifying a chain of callers of the edited function, recomputing and comparing a respective set of summaries recomputed from the callers of the edited function, and stopping re-computation of the current version summary when a procedure with the current version summary matching the previous version summary is found;

updating a summary of each edited function with the current version summary; and identifying a set of called functions from the set of edited functions and adding a set of called functions universally available to the set of impacted functions;

performing an incremental top-down analysis over the set of impacted functions by traversing the call graph in a top-down order and perform an incremental functional approach-based dataflow analysis over the set of impacted functions based on the current version summary of the source code, the incremental bottom-up analysis, and the incremental top-down analysis, wherein the incremental functional approach-based dataflow analysis forms a summary of each procedure using a bottom-up traversal over the call graph, analyzes every procedure only once even if the procedure includes multiple calls and resulting summaries computed using the bottom-up traversal replace calls in a set of caller functions to construct a summary of the set of caller functions and the call graph is traversed in bottom-up order, implementing the incremental functional approach-based dataflow analysis as an incremental static analysis tool that upon execution provides analysis and additionally stores program analysis information.

6. The system as claimed in claim 5, wherein the incremental bottom-up analysis computes a set of edited functions summaries and a set of function summaries marked as the set of impacted functions, wherein the summaries are computed based on at least one change observed when the current version summary and the previous version summary are compared.

7. The system as claimed in claim 5, wherein the incremental top-down analysis updates one or more dataflow values of the set of impacted functions by traversing the call graph in the top-down order.

8. The system as claimed in claim 5, wherein performing the incremental top-down analysis comprises:

loading a top-down worklist with a set of procedures and listing the set of impacted functions to be traversed in the top-down order from the worklist;

obtaining the set of impacted functions universally available in the set of functions and in the set of impacted functions;

fetching the set of called functions from the set of impacted functions; and computing an entry of each called function based on a summary of the set of impacted functions and updating the entry of each called function.

9. One or more non-transitory machine-readable information storage mediums comprising one or more instructions which when executed by one or more hardware processors cause:

performing a static dataflow analysis over a set of functions of a source code;

identifying via the one or more hardware processors, a set of edited functions from the set of functions based on at least one change observed in the source code, wherein each function represents a node comprising a set of statements being called in the source code;

obtaining a set of impacted functions based on at least one change observed between a current version summary of the source code and a previous version summary of the source code;

executing a dataflow analysis over the set of impacted functions of the source code which recomputes the set of impacted functions by leveraging one or more cached previous analysis results, instead of re-running an analysis for every changed source code by performing an incremental bottom-up analysis on one or more selected functions from the set of functions being traversed in a bottom-up order of a call graph originated from each edited function, wherein performing the incremental bottom-up analysis further comprises:

loading a bottom-up worklist of a set of edited functions universally available in a worklist;

listing the set of functions to be traversed in the bottom-up order from the bottom-up worklist;

obtaining a previous version summary of the edited function to compute a current version summary of the edited function; and performing when the current version summary of the edited function is not identical to the previous version summary of the edited function, identifying a sequence of a set of caller functions from the set of edited functions and recomputing the current version summary of the set of caller functions, wherein recomputing the current version summary is initially started by identifying a chain of callers of the edited function, recomputing and comparing a respective set of summaries recomputed from the callers of the edited function, and stopping re-computation of the current version summary when a procedure with the current version summary matching the previous version summary is found;

updating a summary of each edited function with the current version summary; and identifying a set of called functions from the set of edited functions and adding a set of called functions universally available to the set of impacted functions;

performing an incremental top-down analysis over the set of impacted functions by traversing the call graph in a top-down order; and performing an incremental functional approach-based dataflow analysis over the set of impacted functions based on the current version summary of the source code, the incremental bottom-up analysis, and the incremental top-down analysis, wherein the incremental functional approach-based dataflow analysis forms a summary of each procedure using a bottom-up traversal over the call graph, analyzes every procedure only once even if the procedure includes multiple calls and resulting summaries computed using the bottom-up traversal replace calls in a set of caller functions to construct a summary of the set of caller functions and the call graph is traversed in bottom-up order, implementing the incremental functional approach-based dataflow analysis as an incremental static analysis tool that upon execution provides exhaustive analysis and additionally stores store program analysis information.

10. The one or more non-transitory machine-readable information storage mediums of claim 9, wherein the incremental bottom-up analysis computes a set of edited function summaries and a set of function summaries marked as the set of impacted functions, wherein the summaries are computed based on at least one change observed when the current version summary and the previous version summary are compared.

11. The one or more non-transitory machine-readable information storage mediums of claim 9, wherein the incremental top-down analysis updates one or more dataflow values of the set of impacted functions by traversing the call graph in the top-down order.

12. The one or more non-transitory machine-readable information storage mediums of claim 9, wherein performing the incremental top-down analysis comprises:

loading a top-down worklist with a set of procedures and listing the set of impacted functions to be traversed in the top-down order from the worklist;

obtaining the set of impacted functions universally available in the set of functions and in the set of impacted functions;

fetching the set of called functions from the set of impacted functions; and computing an entry of each called function based on a summary of the set of impacted functions and updating the entry of each called function.

* * * * *